United States Patent Office 3,183,262
Patented May 11, 1965

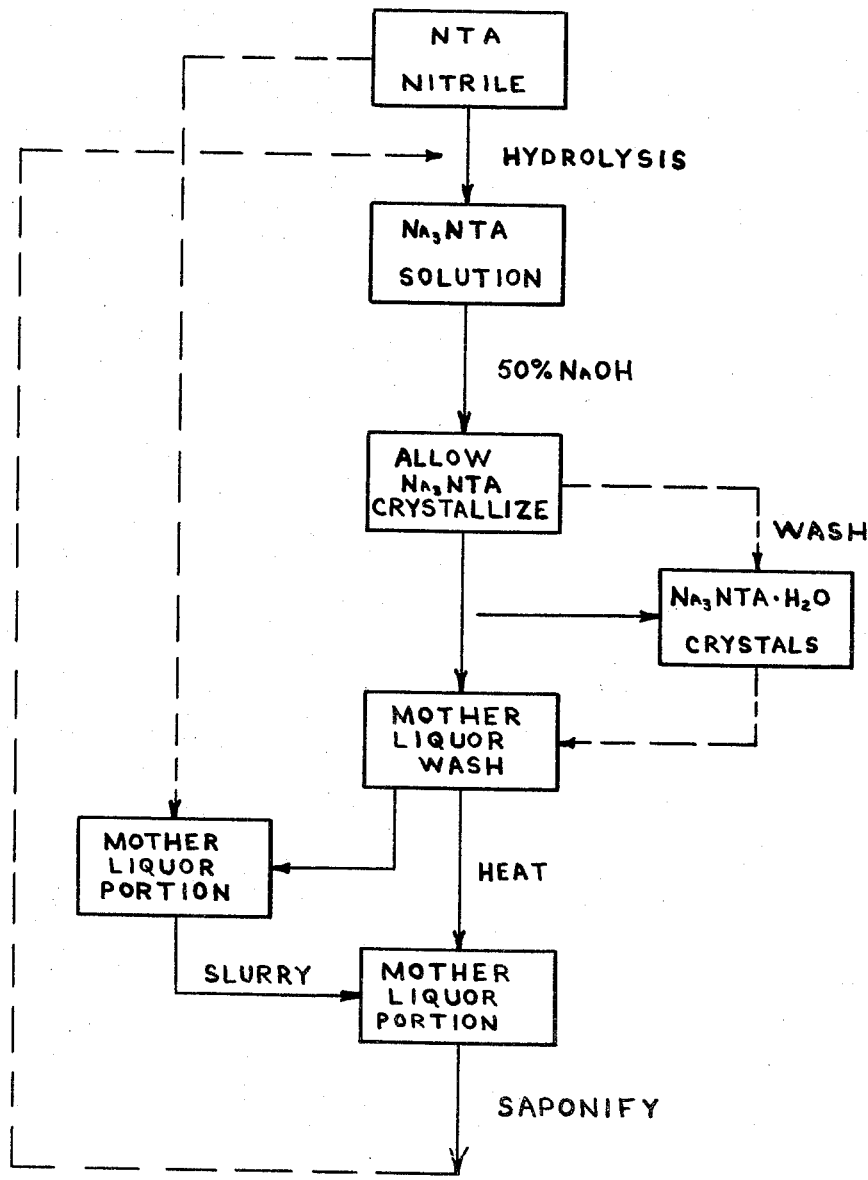
FLOW DIAGRAM

3,183,262
PROCESS FOR THE PREPARATION OF
SODIUM NITRILO TRIACETATE
John J. Singer, Westboro, Mass., and James P. Singer, Nashua, N.H., assignors to Hampshire Chemical Corporation, Nashua, N.H., a corporation of Delaware
Filed Oct. 25, 1961, Ser. No. 147,637
5 Claims. (Cl. 260—534)

This invention relates to the preparation of salts of nitrilo triacetic acid by the hydrolysis of the corresponding nitrile and, particularly, to a cyclic operation involving the hydrolysis of such nitrile to salt form on a quantitative material balance basis, wherein all of the nitrile is recovered ultimately as salt and excess hydrolysis agent is employed in recycle for conversion of more nitrile. The invention thus is concerned with a cyclic manipulation of alkali metal hydroxide solution, of preferred equilibrium concentration related to the solubility of the nitrilo triacetic acid salt formed.

In United States Patent 2,855,428, issued October 7, 1958, John J. Singer and Mark Weisberg, which is fully incorporated herein, there is disclosed a fundamental process for the preparation of acetonitrile compounds wherein the process consists of reaction of an amine, formaldehyde, and hydrogen cyanide in an acid medium at controlled pH to induce the formation and precipitation of the corresponding nitrile. In application Serial No. 760,551, filed September 12, 1958, now Patent No. 3,061,628, Singer and Weisberg, an improvement or modification of that process is described to obtain nitrile compounds, which application in turn is fully incorporated herein.

It is a fundamental object of the invention to provide a process for crystallizing the nitrilo triacetic acid compounds in a manner which is efficient in its utilization of materials.

It is another object of the invention to provide a cyclic operation for the conduct of the process of preparing essentially dry nitrilo triacetic salt crystals.

Other objects and advantages of the invention will in part be obvious and in part appear hereinafter.

The invention accordingly is embodied in a process for the preparation of nitrilo triacetic acid salts by hydrolysis from the nitrilo triaceto form, wherein an aqueous solution of the nitrilo triacetic acid is first treated with sodium hydroxide to bring the sodium hydroxide content of the solution to a level of about 16% by weight, whereupon the nitrilo triacetic acid salt approaches or passes through a point of minimum water solubility and crystallizes as the trisodium salt. Following this the crystalline form of the precipitated salt is removed and a portion of the mother liquor, which contains free hydroxide, is slurried with the nitrilo triaceto nitrile and a second portion thereof is heated to a high saponification temperature, at all times keeping the proportions of water down to a minimum. The slurry of the nitrile in the amino acid salt solution and the mother liquor from the crystallization which contains a substantial quantity of excess alkali metal hydroxide is heated in a saponifiction vessel to complete saponification of the nitrile to the salt of the amino acid and the thus formed concentrated solution of the amino acid salt is then recycled into the crystallization process to be combined with alkali metal hydroxide in amounts sufficient to induce the crystallization. In this fashion a cyclic manipulation of a certain amount of water, nitrile and alkali metal hydroxide is conducted, wherein quantitative recoveries of the nitrilo triacetic acid salts are obtained, together with quantitative utilization of the alkali metal hydroxide, the alkali metal hydroxide being effectively converted to the salt of the acid in an aqueous medium, all without excessive or appreciable evaporation of water. It will be seen from the manipulation, therefore, that where it becomes possible to conduct a saponification in this fashion without removal of water, substantial economies are effected.

In the following examples, experimental data and plant data are given in terms of sodium hydroxide. It is to be understood that parallel, though less efficient operations are carried out using potassium hydroxide.

For example, we have found that trisodium nitrilo triacetate can be crystallized from an aqueous solution in very high yields by adding sodium hydroxide to concentrated solutions, essentially saturated, of the sodium salt of nitrilo triacetic acid. Generally we were able to obtain 50% crystallization with the addition of approximately 12% free sodium hydroxide to the sodium nitrilo triacetate solution. Crystallization of the alkali metal salt then occurs with very little change in temperature of the solution, the crystals being formed as large, rather easily workable particles, without any significant deepening of the color of the supernatant solution comprising the mother liquor. Following separation, the crystals are washed with a saturated solution of the trisodium salt of the nitrilo triacetic acid to remove any mother liquor carrying alkali metal hydroxide adhering to the surfaces of the crystals.

Thereafter, the crystals are washed with the caustic free solutions of the sodium salt of nitrilo triacetic acid which was produced after saponification to provide a product which is free of adsorbed caustic.

In the diagram accompanying this specification we have indicated by means of conventional block designations the flow of material in a sequence of steps constituting a summary of the process.

The process, since manipulation consists of the steps thus cyclically handling the chemicals, is one which permits conversion of any percentage of the nitrile product, up to 100% thereof, into a dry salt form without the evaporation of water, without the loss of mother liquor or product; and by washing with the caustic-free solution produced after saponification, it is possible to obtain a product which is free of solid caustic.

The details of the invention will be better understood by reference to the following specific examples:

*Example I*

Nitrilotriacetonitrile was prepared in accordance with the process described in United States Patent 2,855,428.

A sequence of experiments was conducted after saponification using 500 gram portions of 40% nitrilo triacetic acid sodium salt solution heated to a temperature of 90° C. to 95° C. with stirring. Sodium hydroxide in 50% concentration was then slowly added and the mixture stirred for 20 minutes at a temperature of 90° C. to 95° C. The heat was then discontinued and the stirring continued for about 10 minutes. The mixture was then cooled, with some stirring and filtered, the product being dried in an oven. The product as recovered is the monohydrate of trisodium nitrilo triacetate.

The following table summarizes the results when product was recovered at the several temperature levels indicated in a series of experiments wherein the amount of sodium hydroxide added to the 40% trisodium nitrilo triacetate solution was as shown:

| Crystallization Medium | I | II | III | IV | V |
|---|---|---|---|---|---|
| NaOH, Grams | 25 | 50 | 75 | 100 | 125 |
| Water, Grams | 25 | 50 | 75 | 100 | 125 |
| Sodium nitrilo triacetate yield | | | | | |
| Filtering Temp.: | | | | | |
| 20° C | 44.5 | | 147.5 | | 210.0 |
| 30° C | | 105.0 | | 198.5 | |
| 40° C | 49.5 | | 148.5 | | 201.5 |
| 50° C | | 87.0 | | 179.0 | |

The color of the filtrates range from 110 to 280 on the APHA scale. The chelating value of the crystals averaged 330 milligrams of calcium carbonate per gram.

It will be apparent from an inspection of the table that the recovery of nitrilotriacetic acid sodium salt is closely correlated to the amount of sodium hydroxide used. For example in Test I where 25 parts are shown, the recovery at 20° C. and at 40° C. is relatively small. With an increased amount, that is to 50 parts of sodium hydroxide, the recovery at 30° C. and 50° C. is very substantial and in fact is more than proportional to the sodium hydroxide used.

With respect to the third example wherein 75 parts of sodium hydroxide were used, it is quite clear that the proportion is substantially higher than would be suggested by the first experiment, namely three times as much sodium hydroxide was used but the recovery of the sodium salt of the nitrilotriacetic acid was substantially more than three times the original.

In the fourth sequence of tests the disproportionation is even more striking and in the fifth sequence of tests the proportions of the nitrilotriacetate recovered approach quantitative. That is 500 grams of a sodium nitrilotriacetate solution giving 200–210 grams of the salt is giving virtually a quantitative yield. Forty percent is about a saturated solution.

It will be apparent, therefore, that as the proportion of sodium hydroxide added to the solution is increased, namely where the proportion added approximates that which can be used with a saturated solution, the best results were obtained in terms of recovery of triacetate salt. However, a phenomenon like this is best balanced and, accordingly, for operational purposes we have found that sodium hydroxide solution in a 50% concentration added to the 40% NTA—Na3 solution at a rate to put in about 50% by weight of sodium hydroxide solution becomes a very satisfactory one for carrying out the process.

*Example II*

In the following, all parts are by weight.

1900 parts of NTANa3 solution is heated to a temperature of 90° C. in solution and 940 parts of 50% sodium hydroxide solution added. Stirring is continued until the temperature drops to 40° C. Thereafter the crystals are filtered off slowly and the crystals are washed with 100 parts of substantially saturated nitrilotriacetic acid sodium salt solution at room temperature. Thereafter the crystals are dried in an oven. The total amount of filtrate was 2135 parts by weight. The total yield nitrilotriacetic acid sodium salt crystals was 699 parts. Apparent density of the crystals is 6.43 pounds per gallon, 48.06 pounds per cubic foot, the chelating value with measurement against calcium carbonate was 356 milligrams of calcium carbonate per gram of material.

*Example III*

In a second batch, 700 parts of cold filtrate from Example II was used to make a slurry with 410 parts of nitrilotriacetonitrile. The balance of the filtrate was heated to 95° C. and the slurry slowly added and heated until ammonia boiled off. The solution was bleached with Albone. After saponification was complete, the mass was adjusted with water to a total weight of 2182 parts and 750 parts of 50% sodium hydroxide solution was added. Thereafter the mixture was cooled to 40° C. with stirring and the solution filtered. The crystals thus obtained were washed with 100 parts of substantially saturated nitrilotriacetic acid sodium salt solution and thereafter dried in an oven. The total filtrate obtained was 1330 parts, the weight of the crystals was 1077 parts dry and they have a chelating value of 336 milligrams of calcium carbonate per gram.

The procedure of the preceding example was repeated with the exception that 850 parts of water were added to the filtrate prior to saponification and the mixture cooled slowly without stirring. The total filtrate obtained was 1714 parts, the weight of the crystals 703 parts.

*Example IV*

In a refinement of the technique, it is possible to induce precipitation of the nitrilotriacetic acid sodium salt solution by adding sodium hydroxide in increments and ageing the solution between additions.

1900 parts of the sodium salt of nitrilotriacetic acid in solution was heated to 100° C. and 235 parts of 50% sodium hydroxide added slowly, stirring at a relatively low speed. The stirring was continued while the temperature of the total was maintained at 90° C. to 100° C. At one hour intervals three additional 235 part portions of 50% sodium hydroxide were added. One hour after the last portion was added, heat was removed. The entire mass was then cooled slowly to 60° C. with gentle stirring and filtered. There the crystals were washed with 100 parts of hot essentially saturated nitrilotriacetic acid sodium salt solution and dried in an oven. The weight of the crystals thus obtained was 945 parts.

In these operations a relatively large or coarse crystal size was obtained which appeared to be not significantly affected by the details of the manipulation employed in the process.

It is to be noted that the hydrolyzed solution of the sodium salt of nitrilotriacetic acid is mixed with a solution of alkali metal hydroxide in amounts substantially in excess of the stoichiometric quantity necessary for hydrolysis alone, thereby inducing a precipitation of the nitrilotriacetic acid sodium salt as a coarse crystal, following which the filtrate which contains excess sodium hydroxide, a certain amount of nitrilotriacetate, and some other hydrolyzed material in solution, is used as a hydrolysis medium for another batch while the nitrilotriacetic acid sodium salt solutions are used as wash for the crystals. The net result of this manipulation of solutions is a very efficient production of the sodium nitrilotriacetate crystals, conservation of materials, and complete recovery of all materials on a material balance basis. This is illustrated by the following example showing a set of typical data for plant runs.

*Example V*

Starting with an aqueous solution of the sodium salt of nitrilotriacetic acid.

In a batch quantity the following amounts of materials are used in accordance with the following schedule:

7,950# NTANa3.H2O ⎫ 19,000# of NTA 150
11,050# H2O ⎭
4,700# NaOH (100%) ⎫ 9,400# of 50% NaOH
4,700# H2O ⎭

28,400 total before filtration

Thus by the admixture of 19,000 pounds of the nitrilotriacetic acid sodium salt solution and 9400 pounds of the 50% sodium hydroxide solution, a crop of nitrilotriacetate crystals is formed. This is filtered off at 40° C. with the following result:

Filtrate=20950#+1000# new product
Crystals=7450# washed with 1000# of new product added to filtrate In the second stage of the cycle 7000 pounds of filtrate is mixed with 4100 pounds of nitrilotriacetonitrile to form a slurry. The balance of the filtrate is heated to saponification temperature and the slurry is slowly added. Following completion of the saponification the total weight is adjusted to 21820 pounds and there is added 7500 pounds of 50% caustic to give a total weight of 29320 pounds. Crystals form as the coarse yield of nitrilotriacetate and these are filtered off at 40° C. The total recovery of crystals at this stage is 8370 pounds and the total weight of mother liquor for recycle into the process is 20950 pounds. The process at this stage is repeated on substantially this scale with effectively the following results:

20,950#
4,100# of (Caustic 22.5%)

25,050# of Mix
3,600

21,450# after Saponification

Based on this theme and this operation it will be seen that the hydrolysis of the aminonitrile compounds may be efficiently carried out in an alkali metal hydroxide medium.

Whatever nitriles it is desired to make, particularly as they are made in the issued Patent 2,855,428, can be converted to the corresponding acetate solution in the hydrolysis and thereafter the salt crystals recovered.

Though the invention has been described with reference to only a limited number of examples, its principles may be readily understood and it may be practiced with variations without departing from the spirit of the examples.

What is claimed is:

1. A method of converting nitrilo triaceto nitrile into sodium nitrilo triacetate as its hydrolysis product, which comprises providing nitrilo triaceto nitrile, a stoichiometric quantity of sodium hydroxide, and sodium nitrilo triacetate in solution in an amount corresponding to the reaction product of said nitrilo triaceto nitrile and sodium hydroxide, adding the sodium hydroxide to the aqueous solution of sodium nitrilo triacetate, thereby to provide a solution having about 15-20% free sodium hydroxide therein, separating crystals of sodium nitrilo triacetate formed, thereby to provide a mother liquor containing free sodium hydroxide and a residual small amount of sodium nitrilo triacetate, adding to said mother liquor nitrilo triaceto nitrile to form a slurry, hydrolyzing said nitrile to form a solution of sodium nitrilo triacetate and, thereafter, repeating the cycle.

2. The method of carrying out a crystallization of sodium nitrilo triacetate from solution, which comprises combining a solution of sodium nitrilo triacetate and sodium hydroxide to make a net concentration of about 15-20% of free sodium hydroxide, causing sodium nitrilo triacetate to crystallize from said solution, separating solid sodium nitrilo triacetate from said solution to obtain a mother liquor, holding said mother liquor to be combined with solid nitrilo triaceto nitrile to form a slurry, thereby to commence another cycle of hydrolysis with free sodium hydroxide.

3. A process for preparing crystalline sodium nitrilo triacetate from nitrilo triaceto nitrile as a hydrolysis product thereof, which comprises providing, in accordance with claim 1, substantially stoichiometric amounts of nitrilo triaceto nitrile, sodium hydroxide and sodium nitrilo triacetate, mixing said aqueous solution of sodium nitrilo triacetate with said sodium hydroxide solution to form a net solution with about 16% free sodium hydroxide, thereby inducing formation of sodium nitrilo triacetate salt crystals, separating said crystals, washing said crystals with said mother liquor, combining said mother liquor with nitrilo triaceto nitrile to form a slurry and adding thereto the sodium nitrilo triacetate mother liquor, thereby to commence repetition of the cyclic process of hydrolysis, crystallization and separation.

4. A process in accordance with claim 3 in which the temperature of the reaction medium is kept below about 100° C.

5. A process in accordance with claim 3 in which the temperature of the separating medium is kept in the range from about 20° C. to about 50° C.

References Cited by the Examiner
UNITED STATES PATENTS

| | | | |
|---|---|---|---|
| 2,845,457 | 7/58 | Kroll | 260—534 |
| 2,855,438 | 10/58 | Singer | 260—534 |

LORRAINE A. WEINBERGER, *Acting Primary Examiner.*

LEON ZITVER, *Examiner.*